(12) United States Patent
Chen et al.

(10) Patent No.: US 10,515,528 B2
(45) Date of Patent: Dec. 24, 2019

(54) CAMERA APPARATUS WITH BREATHING LIGHT OF RING-LIKE STRUCTURE

(71) Applicant: Umbo CV Inc., Taipei (TW)

(72) Inventors: Chao-Yi Chen, Taipei (TW); Chih-Wen Ko, Taipei (TW)

(73) Assignee: Umbo CV Inc., Taipei (TW)

( * ) Notice: Subject to any disclaimer, the term of this patent is extended or adjusted under 35 U.S.C. 154(b) by 17 days.

(21) Appl. No.: 15/880,467

(22) Filed: Jan. 25, 2018

(65) Prior Publication Data

US 2018/0211498 A1 Jul. 26, 2018

(30) Foreign Application Priority Data

Jan. 25, 2017 (TW) .............................. 106102882 A

(51) Int. Cl.
| | | |
|---|---|---|
| G08B 13/196 | (2006.01) | |
| H04N 5/225 | (2006.01) | |
| G08B 15/00 | (2006.01) | |

(52) U.S. Cl.
CPC ..... *G08B 13/19626* (2013.01); *H04N 5/2252* (2013.01); *H04N 5/2254* (2013.01); *G08B 15/00* (2013.01)

(58) Field of Classification Search
None
See application file for complete search history.

(56) References Cited

U.S. PATENT DOCUMENTS

| | | | | |
|---|---|---|---|---|
| 4,033,392 A | * | 7/1977 | Less ...................... | A45C 11/38 206/316.2 |
| 4,816,857 A | * | 3/1989 | Blaschek ............... | G03B 17/10 352/35 |
| 5,235,416 A | * | 8/1993 | Stanhope .............. | G01S 17/875 348/139 |
| 7,215,881 B2 | * | 5/2007 | Borngraber ........ | G07C 9/00158 348/14.02 |
| 2002/0131781 A1 | | 9/2002 | Buck | |
| 2014/0192258 A1 | * | 7/2014 | Yang .................... | H04N 5/2256 348/370 |
| 2016/0001018 A1 | * | 1/2016 | Fink .................... | A61M 15/002 128/200.16 |
| 2016/0154244 A1 | * | 6/2016 | Border ............... | G02B 27/0176 359/630 |

FOREIGN PATENT DOCUMENTS

| | | |
|---|---|---|
| EP | 1548675 A1 | 6/2005 |
| EP | 2851747 A1 | 3/2015 |

* cited by examiner

*Primary Examiner* — Clifford Hilaire
(74) *Attorney, Agent, or Firm* — Haverstock & Owens LLP

(57) ABSTRACT

The present invention provides a camera apparatus, comprising: a housing having an interior space; a camera lens disposed in the interior space of the housing; and a breathing light disposed between the housing and the camera lens and encircling the camera lens.

6 Claims, 2 Drawing Sheets

CAMERA APPARATUS WITH BREATHING LIGHT OF RING-LIKE STRUCTURE

BACKGROUND OF THE INVENTION

Field of the Invention

The present invention relates to a camera apparatus, and more particularly, to a camera apparatus with a breathing light of a ring-like structure.

Description of the Prior Art

In today's society, surveillance cameras are widely installed and used in various places, including banks, roads, schools, and private residences, to record images around these places 24 hours a day, generally for the purpose of crime prevention and evidence collection through technological means. In addition, many existing surveillance cameras integrate further with the internet, servers, or storage devices and co-operate with image editing or managing applications to form a security surveillance network system.

A conventional surveillance camera may come with a status indicator light to show the operating status of the camera. For example, a red light may indicate that the camera is down or out of power, and a white light may indicate normal operation of the camera. However, a conventional status indicator light configured on a surveillance camera is usually quite small and not located at a conspicuous position; therefore, when the status indicator light of a surveillance camera indicates a malfunction in the camera, it is not easy for the user to find out and repair of the camera may be delayed.

Moreover, a conventional surveillance camera is usually installed at a location that is less likely to be discovered by offenders or passersby in order to have a better coverage of images. As offenders may not be aware of the existence of a camera, the purpose of preventing crimes by installing a surveillance camera can be hard to achieve, particularly at night. For example, if an offender tries to find out whether a surveillance camera is nearby before committing an offense, poor vision at night due to insufficient light would lead the offender to wrongly believe that there is no surveillance camera at the spot and proceed with the offense. In other words, although installing surveillance cameras is originally meant to prevent crimes beforehand and to collect criminal evidence afterwards, the current development of surveillance camera technologies has been focusing more on evidence collection and less on intimidating criminals, which is a long-existing problem with conventional cameras that needs to be addressed.

SUMMARY OF THE INVENTION

In view of the above, to solve the foregoing problems related to conventional surveillance cameras, including that "indicator lights are hard to observe" and that "preventing crimes is hard to achieve because offenders cannot be intimidated," the present invention provides a camera apparatus, comprising: a housing having an interior space; a camera lens disposed in the interior space of the housing; and a breathing light disposed between the housing and the camera lens and encircling the camera lens. The camera apparatus according to the present invention comprises a breathing light that encircles the camera lens, and therefore, the user can observe the camera apparatus from any angle and will easily notice when it is out of order. Moreover, in addition to intimidating offenders by warning them the existence of a camera apparatus, the breathing light of a ring-like structure arranged on the camera apparatus can attract passersby or the offenders to look at the camera apparatus, and thereby improve the accuracy of facial recognition.

Additionally, the breathing light of the camera apparatus according to the present invention can display a plurality of colors that correspond to a plurality of operating statuses of the camera apparatus, respectively.

Additionally, the camera apparatus according to the present invention further comprises a light cover, which is penetrable by infrared but not by visible light.

Additionally, the camera apparatus according to the present invention further comprises a lens protection glass sheet and a lens and internal light source isolation wall for protecting the camera lens.

Additionally, the camera apparatus according to the present invention further comprises a transparent protective shield surrounding the camera lens.

Additionally, in the camera apparatus according to the present invention, the breathing light is formed by causing at least one light source to emit light that passes through a front side of the camera apparatus.

Additionally, in the camera apparatus according to the present invention, the at least one light source is formed of LEDs and a light guide.

The detailed description of embodiments as follows will illustrate the specific features and advantages of the present invention. The following description contains the knowledge that suffices to enable those skilled in the art to understand and implement the present invention. Based on the content, appended claims and drawings disclosed in this specification, those skilled in the art can easily grasp the objectives and advantages of the present invention.

DETAILED DESCRIPTION OF THE PREFERRED EMBODIMENTS

Figure 1:
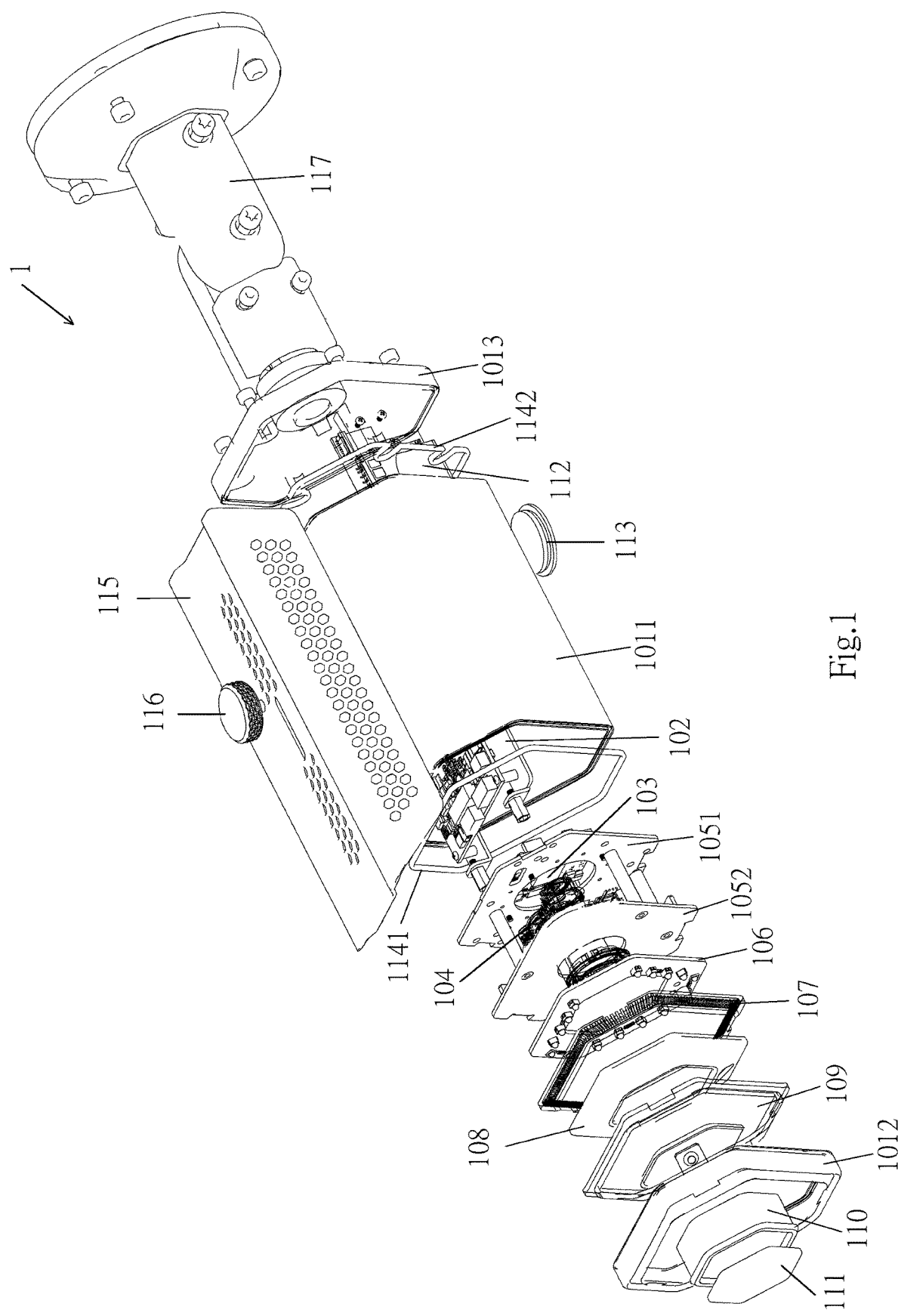
FIG. 1 is an exploded schematic perspective showing a camera apparatus according to an embodiment of the present invention.

The following description will illustrate the exemplary embodiments of the present invention. It should be noted that the embodiments described are for illustration purposes and are not intended to limit the scope of the invention to specific features, structures, or nature contained in these embodiments. The scope of the invention should, however, be determined with reference to the appended claims. Besides, the referenced drawings in the description do not show all the unnecessary features of the present invention, and the elements may be shown in a simplified, schematic view. Dimensions of the elements in the drawings may be enlarged or disproportionate to their actual sizes for the purpose of illustration. Despite the simplifications described above and regardless of whether relevant features are illustrated comprehensively, it should be appreciated that the description contains the knowledge based on which various other embodiments of the invention with related features, structure or nature can be implemented by those skilled in the art.

Figure 2:
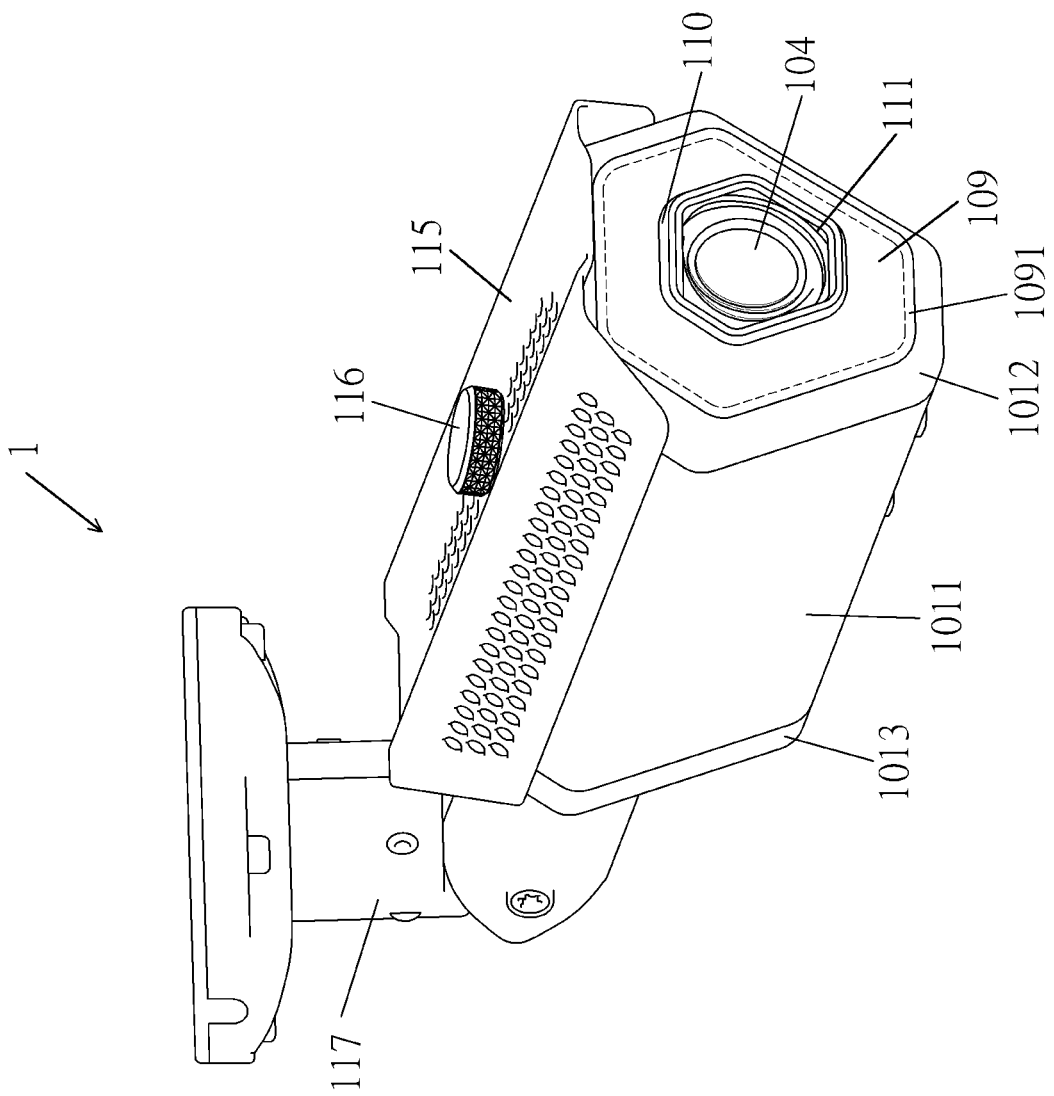
FIG. 2 is a schematic perspective view showing the camera apparatus in an assembled state according to an embodiment of the present invention.

FIG. 1 is an exploded schematic perspective view showing a camera apparatus according to a preferred embodiment of the present invention, and FIG. 2 is a schematic perspective view showing the camera apparatus in an assembled state. The camera apparatus 1 comprises a housing, which is composed of a tubular portion 1011, a front securing portion 1012 and a rear securing portion 1013. When the front securing portion 1012 is joined to the front opening of the tubular portion 1011, and the rear securing portion 1013 is joined to the rear opening of the tubular portion 1011, the housing will contain an interior space to accommodate a main circuit board 102, a CMOS sensor circuit board 103 and a camera lens 104. The camera lens 104 may be supported and secured by means of central openings provided on a first securing member 1051 and a second securing member 1052.

The camera apparatus 1 further comprises an infrared and breathing light LED circuit board 106 and a light guide 107; both are of a ring-like structure and encircle the camera lens 104. Light emitting from a number of LEDs arranged on the front, side or back surface of the LED circuit board 106 works together with the light guide 107 to provide the light source for a breathing light 1091. The camera apparatus 1 further comprises a light cover 108 that is penetrable by infrared but not by visible light. The dimensions of the light cover 108 are designed in a way that the foregoing light source will not be blocked, and the light cover can be (but is not limited to) in violet color. When the front securing portion 1012 is joined to the front opening of the tubular portion 1011, then the main circuit board 102, the CMOS sensor circuit board 103, the camera lens 104, the LED circuit board 106, the light guide 107, and the light cover 108 will be received and secured in the interior surface. Besides, the camera apparatus 1 further comprises a transparent protective shield 109 disposed between the front securing portion 1012 and the light cover 108 to protect the light cover 108 and other internal components. Additionally, a lens and internal light source isolation wall 110 and a lens protection glass sheet 111 are provided to protect the camera lens 104. The design described above can protect the camera apparatus and achieve the purpose of dust prevention, water resistance and damage prevention, and allow the infrared and light emitted by the breathing light of a ring-like structure, both of which come from within the camera apparatus, to pass through.

In another preferred embodiment of the present invention, the camera apparatus 1 may include a memory card plate 112 for the user to insert the memory card (not shown in the drawings) that stores images taken by the camera apparatus 1. After the user insets the memory card, a memory card protective cap 113 is used to protect the memory card. The camera apparatus 1 may further include water-proof rubber members 1141 and 1142 respectively arranged between the front securing portion 1012 and the tubular portion 1011, and between the rear securing portion 1013 and the tubular portion 1011, so as to improve the water resistance of the camera apparatus 1. On the other hand, the camera apparatus 1 may include a sun shield 115, which is secured onto the tubular portion 1011 by a sun shield securing screw 116, so as to prevent the camera apparatus 1 from direct exposure to sunlight. Further, the camera apparatus 1 comprises a support 117, so that the user can use it to secure the camera apparatus 1 to a proper place, such as the ceiling or a higher spot on the wall.

Please refer to both FIGS. 1 and 2. The camera apparatus 1 according to the present invention comprises a plurality of LEDs disposed on the back surface of the LED circuit board 106, and light emitted by the plurality of LEDs works together with the light guide 107 and passes through the front side of the camera apparatus 1, that is, through a light-transmittable area around the transparent protective shield 109, and thereby forms the breathing light 1091. The above-mentioned light-transmittable area is the region where the breathing light 1091 functions, as shown in FIG. 2. And with the configuration of the light cover 108, which is impenetrable by visible light, the breathing light can create a ring-like effect. The camera apparatus 1 then includes a breathing light 1091 of a ring-like structure disposed between the housing and the camera lens 104. The breathing light 1091 can display a plurality of colors that correspond to a plurality of operating statuses of the camera apparatus, respectively. For example (but not limited to), a white light indicates the camera apparatus is "online"; a green light indicates "connecting"; a red light indicates "server error"; and a yellow light indicates "NTP (Network Time Protocol) error."

In view of the above, with the breathing light 1091 of a ring-like structure, the camera apparatus 1 according to the present invention can make its existence noticed by passersby and also allow the user to easily check the operating status thereof. As such, the camera apparatus 1 according to this invention is able to solve technical problems related to prior art devices, such as "indicator lights are hard to observe" and "preventing crimes is hard to achieve because offenders cannot be intimidated." In sum, the camera apparatus according to this invention is able to achieve the following results: malfunctions with the apparatus can be easily discovered; offenders can be intimidated; and the accuracy of facial recognition can be improved as well.

Preferred embodiments of the present invention have been illustrated through the above description and the accompanying drawings. All the features disclosed in the description may be used in combination with other methods, and each feature disclosed herein may be optionally replaced by another feature which serves an identical, equivalent or similar purpose. Hence, except for the features that are particularly obvious, each feature disclosed in the description merely serves as one example from equivalent or similar features.

Various alterations and modifications to the invention will become apparent to those skilled in the art after reading the above description of the preferred embodiments; such alterations and modifications are intended to be included within the spirit and scope of the present invention. The scope of the invention should not be limited to the exemplary embodiments described herein.

What is claimed is:
1. A camera apparatus, comprising:
a housing having an interior space;
a camera lens disposed in the interior space of the housing;
an infrared and breathing light LED circuit board and a light guide, wherein a plurality of LEDs are disposed on the back surface of the infrared and breathing light LED circuit board, and
a light cover penetrable by infrared but not by visible light,
wherein lights emitted by said plurality of LEDs works together with the light guide to form a breathing light disposed between the housing and the camera lens and encircling the camera lens in a ring-like effect.

2. The camera apparatus of claim 1, wherein the breathing light can display a plurality of colors that correspond to a plurality of operating statuses of the camera apparatus, respectively.

3. The camera apparatus of claim 1, wherein the light cover is disposed between the breathing light and the camera lens.

4. The camera apparatus of claim 1, wherein the breathing light is formed by causing at least one light source to emit light that passes through a front side of the camera apparatus.

5. The camera apparatus of claim 1, further comprising a lens protection glass sheet and a lens and internal light source isolation wall for protecting the camera lens.

6. The camera apparatus of claim 1, further comprising a transparent protective shield surrounding the camera lens.

\* \* \* \* \*